United States Patent [19]

Ohki et al.

[11] Patent Number: 5,416,578
[45] Date of Patent: May 16, 1995

[54] WAVEGUIDE TYPE WAVELENGTH MEASURING APPARATUS

[75] Inventors: Hiroshi Ohki; Jun Iwasaki, both of Yokohama, Japan

[73] Assignee: Nikon Corporation, Tokyo, Japan

[21] Appl. No.: 264,260

[22] Filed: Jun. 22, 1994

Related U.S. Application Data

[63] Continuation of Ser. No. 156,928, Nov. 24, 1993, abandoned, which is a continuation of Ser. No. 775,569, Oct. 15, 1991, abandoned.

[30] Foreign Application Priority Data

Oct. 18, 1990 [JP] Japan ................................. 2-279925

[51] Int. Cl.6 ............................ G01J 3/00; G01B 9/02
[52] U.S. Cl. .................................. 356/300; 356/346; 250/227.23
[58] Field of Search ................... 356/300, 346; 385/28, 385/29, 31, 45; 250/227.18, 227.23

[56] References Cited

U.S. PATENT DOCUMENTS 4,761,049  8/1988  Burns et al. ............................ 385/28
4,779,984 10/1988  Cook ..................................... 356/346

FOREIGN PATENT DOCUMENTS 0222232  9/1988  Japan ............................... 250/227.23

OTHER PUBLICATIONS

Yap et al, "Passive Ti:LiNbO3 Channel Waveguide TE-TM Mode Splitter" Applied Physics Letters vol. 44, #6, Apr. 15, 1984, pp. 583-585.

*Primary Examiner*—Vincent P. McGraw
*Assistant Examiner*—K. P. Hantis
*Attorney, Agent, or Firm*—Shapiro and Shapiro

[57] ABSTRACT

A waveguide type wavelength measuring apparatus is provided with a single mode channel type optical waveguide formed on a waveguide substrate, in which the light to be measured is inputted, a double mode waveguide connected to the single mode channel type optical waveguide, waveguide branches for branching the light output from the double mode waveguide, and photodetectors for detecting independently the light branched by the waveguide branches. The wavelength of the inputted light is measured on the basis of the output signals from the photodetectors. Hence it is possible to perform precise real-time measurement of the wavelength of the incident light with a compact and extremely miniaturized structure.

10 Claims, 2 Drawing Sheets

WAVEGUIDE TYPE WAVELENGTH MEASURING APPARATUS

This is a continuation of application Ser. No. 08/156,928, filed Nov. 24, 1993, now abandoned, which is a continuation of application Ser. No. 07/775,569, filed Oct. 15, 1991, now abandoned.

BACKGROUND OF THE INVENTION

1. Field of the Invention

The present invention relates to a waveguide type wavelength measuring apparatus. More particularly, the present invention relates to a wavelength measuring apparatus capable of measuring light wavelength highly precisely with a compact and simple structure using an optical-waveguide device.

2. Related Background Art

Traditionally, it has been a general practice that the measurement of light wavelength is performed by a spectroscope.

The spectroscope, however, is generally a large apparatus, and considerably complicated procedures are required to measure light wavelength therewith.

Particularly, in recent years, there have been demands for a compact, highly precise, and easy to handle wavelength measuring apparatus for performing the measurement of the power variations of a semiconductor laser, i.e., the wavelength variations of emitted light and other effects accompanying the variations of the inputted amount of current. With the aforesaid spectroscope, it is impossible to meet such demands.

SUMMARY OF THE INVENTION

In consideration of the above-mentioned problem, an object of the present invention is to provide a wavelength measuring apparatus capable of performing highly precise measurements of light wavelength with a compact and simple system.

Another object of the present invention is to provide a wavelength measuring apparatus capable of performing real-time measurements of the wavelength and wavelength variations of an incident light without any complicated procedures.

In order to solve the above-mentioned problem, a waveguide type wavelength measuring apparatus according to a first embodiment of the present invention is provided with a single mode channel type optical-waveguide formed on a waveguide substrate, in which light to be measured is inputted, a double mode waveguide connected to the aforesaid single mode channel type light waveguide, a waveguide branching means for branching the output light from the aforesaid double mode waveguide, and photodetectors each for detecting the light branched by the aforesaid waveguide branching means independently, and is characterized in that the wavelength of the incident light is measured on the basis of the output signals from the aforesaid photodetectors.

A waveguide type wavelength measuring apparatus according to a second embodiment of the present invention is provided with a light branching means for branching into a plurality of paths the propagated light from a single mode channel type optical-waveguide formed on a waveguide substrate, in which the light to be measured is inputted, a double mode waveguide and a waveguide branching means being respectively arranged on each of the output paths of the aforesaid light branching means, and, further, photodetectors each arranged for detecting the respective light branched by the aforesaid waveguide branching means, and is characterized in that the wavelength of the incident light is measured on the basis of the output signals from the aforesaid photodetectors.

Further, a waveguide type wavelength measuring apparatus according to a third embodiment of the present invention is arranged in such a manner that the aforesaid waveguide substrate is constructed with a dielectric crystal having electro-optical effect, and electrodes are provided in the aforesaid double mode waveguide region, and is characterized in that the wavelength of the incident light is measured on the basis of the voltage applied to the aforesaid electrodes and the outputs from the photodetectors.

In the aforesaid waveguide type wavelength measuring apparatus according to the first embodiment, the aforesaid light to be measured which is inputted into the aforesaid single mode channel type optical-waveguide is continuously inputted into the double mode waveguide region. The incident light in this double mode waveguide region is pumped by an even mode (0th mode) and odd mode (first order mode), and by the interference between these two modes, and the center of the optical energy is propagated both ways or vibratingly in the transverse direction in the waveguide in the double mode waveguide region. The length of the double mode waveguide region required for this optical energy to reciprocate in half a cycle is called a coupling length Lc. A structure having a double mode waveguide region and a subsequent branching means may be base on a known TE-TM mode splitter, for example, but the arrangement should be such that the length of the double mode waveguide region with respect to the incident light of both TE and TM modes is set to be odd times and even times of the coupling length Lc (or even times and odd times thereof).

The coupling length Lc can also be varied by the wavelength variations of an incident light coming into the double mode waveguide region. Therefore, if the length of the double mode waveguide region is constant, the central position of the optical energy at the output end of the aforesaid double mode waveguide region is displaced in the width direction of the waveguide. As a result, in the subsequent branching means, the power ratio, i.e., the energy ratio, of the light induced into each of the optical waveguides, which is the output path of the aforesaid branching means, can be varied. In this respect, it should be clear that the longer the double mode waveguide region, the greater becomes the variation of the power ratio against a slight variation of the wavelength.

In the present invention, the above-mentioned principle is applied to the wavelength measurement. In other words, the ratio between the optical energies propagated to the respective output paths by the waveguide branching means is obtained on the basis of the output signals from each of the photodetectors which detects independently the respective light passing through the double mode waveguide region and branched by the aforesaid waveguide branching means as described above. From this ratio, the wavelength of the incident light is measured.

In the above-mentioned waveguide type wavelength measuring apparatus according to the second embodiment, the light to be measured which has been inputted into the single mode channel type optical waveguide is branched into plural paths by the aforesaid light branching means. Then, by the double mode waveguide and waveguide branching means provided on each of the paths, and each of the photodetectors provided for the branched output of the aforesaid waveguide branching means, the wavelength of the incident light is measured by each of the paths as in the case of the aforesaid first embodiment. Then, in this case, by arranging the length of the double mode waveguide provided on each path to be varied from the other, it is possible to perform a rough measurement of the light to be measured and fine measurement thereof simultaneously, thus implementing a precise measurement of the wavelength in a wide range.

Furthermore, in a waveguide type wavelength measuring apparatus according to the aforesaid third embodiment, electrodes are arranged in the double mode waveguide region of the aforesaid first embodiment or second embodiment, and by adjusting the voltage applied to the aforesaid electrodes, the energy of the output light of the waveguide branching means connected to each of the double mode waveguide regions is equalized, for example. In other words, the output of the photodetector provided for each of the branched outputs of the waveguide branching means is equalized. Therefore, if the relationship between the applied voltage to the aforesaid electrodes for the equalization of the wavelength of the incident light and the output of each photodetector is obtained beforehand, the unknown wavelength of an incident light can be obtained from the voltage to be applied to the aforesaid electrode. Moreover, in this case, the wavelength of an incident light can be measured with a constant and maximum sensitivity.

DESCRIPTION OF THE PREFERRED EMBODIMENTS

Hereinafter, in conjunction with the accompanying drawings, the embodiments according to the present invention will be described.

Figure 1:
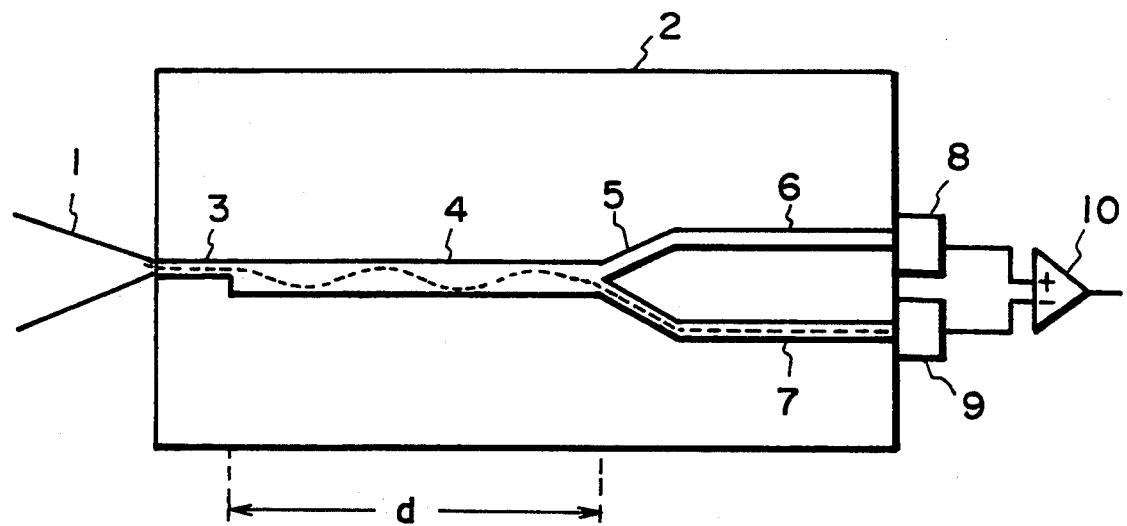
FIG. 1 is a plan view schematically showing the structure of a waveguide type wavelength measuring apparatus according to a first embodiment of the present invention.

FIG. 1 is a view schematically showing the structure of a waveguide type wavelength measuring apparatus according to a first embodiment of the present invention. The apparatus shown in FIG. 1 is provided with a waveguide substrate 2, a single mode channel type optical waveguide 3 formed on the aforesaid waveguide substrate 2, a double mode waveguide region 4 connected to the single mode channel type optical waveguide 3, waveguide branches 5 connected to the output end of the double mode waveguide region 4, and single mode channel type waveguides 6 and 7 connected respectively to the aforesaid waveguide branches 5. The double mode waveguide may be constructed by two single mode channel type optical waveguides adjacent to each other. Photodetectors 8 and 9 are connected to each of the output ends of the single mode channel type waveguides 6 and 7, and the output from each of the photodetectors 8 and 9 is inputted into a differential amplifier 10. In this respect, although each of the photodetectors 8 and 9 is directly connected to each of the waveguides 6 and 7 in FIG. 1, it may be possible to output the light to the outside from each of the waveguides 6 and 7 once, and then, to guide the light thus output to the photodetectors arranged at positions apart therefrom through lenses and other components. Here, using a semiconductor such as silicon for the waveguide substrate 2, the photodetectors 8 and 9 and other components can be formed on the same substrate with the waveguide portions monolithically.

In the apparatus shown in FIG. 1, an incident light, i.e., the light to be measured 1, is inputted into the single mode channel type optical waveguide 3 formed on the waveguide substrate 2. The light which is propagated in the optical wave guide 3 proceeds subsequently to the double mode waveguide region 4. Here, the center of the optical energy travels in a zigzag direction while moving both ways or vibrating in the width-wise direction of the waveguide by the interference of an even mode and an odd mode is shown by a dotted line, for example. At the output end of the double mode waveguide region 4 where light enters into the waveguide branches 5, the light is assigned to be inputted into each of the single mode channel type optical waveguides 6 and 7 by the ratio defined by the central position of the optical energy in the width-wise direction in the waveguide. The light propagated through each of the single mode optical waveguides 6 and 7 is inputted into each of the photodetectors 8 and 9 to be converted into electric signal. Then, the electric signal output from each of the photodetectors 8 and 9 is inputted into the differential amplifier 10, and an output signal corresponding to the difference between the two electric signals is output therefrom as a wavelength measuring signal.

Figure 2A:
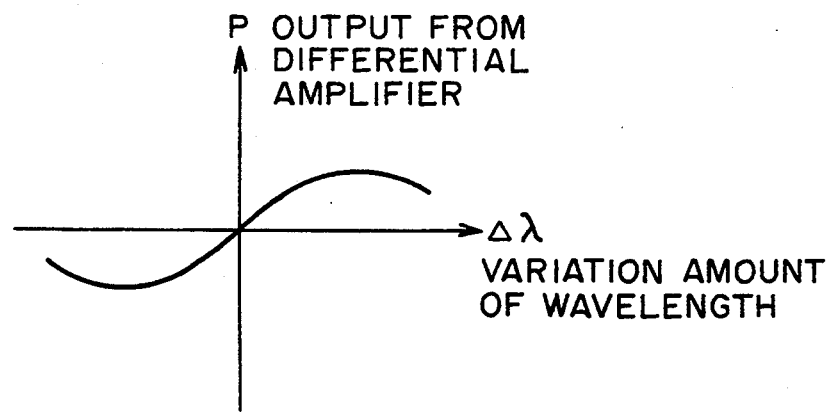
FIG. 2A and FIG. 2B are graphs showing the relationship between the variation amount of wavelength and the output from the differential amplifier in the apparatus shown in FIG. 1, respectively.
Figure 2B:
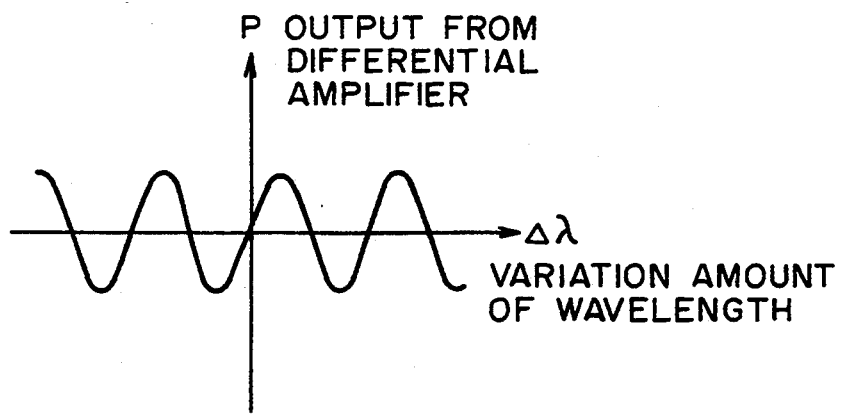

FIGS. 2A and 2B illustrate examples of wavelength measuring signals. FIG. 2A illustrates the relationship between the differential amplifier output P and the variation amount $\Delta\lambda$ where the length d of the double mode waveguide region 4 is comparatively short. Also, FIG. 2B illustrates the characteristics where the length d of the double mode waveguide region 4 is comparatively long. As clear from these graphs, the longer the length d of the double mode waveguide region 4, the more suitable it is for measuring the finer variations of the wavelength.

Figure 3:
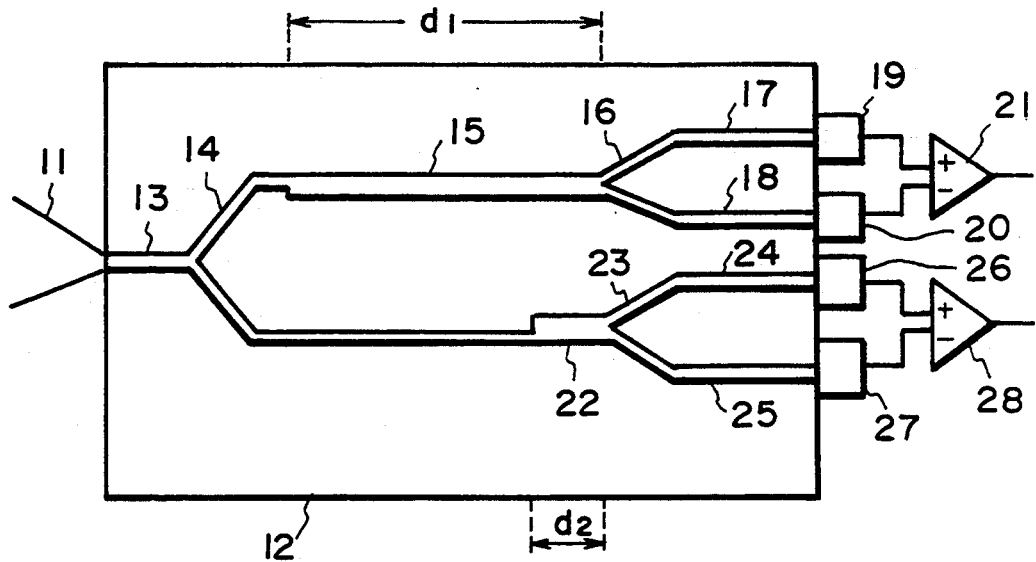
FIG. 3 is a plan view schematically showing a waveguide type wavelength measuring apparatus according to a second embodiment of the present invention.

FIG. 3 is a view schematically showing the structure of a waveguide type wavelength measuring apparatus according to a second embodiment of the present invention. The apparatus shown in FIG. 3 is provided with a single mode channel type optical waveguide 13 formed on a waveguide substrate 12, and one end of this single mode channel type optical waveguide 13 constitutes an incident light inlet. Also, in the apparatus shows in FIG. 3, there are provided waveguide branches, i.e., a Y branch 14, connected to the aforesaid single mode channel type optical waveguide 13, double mode waveguide regions 15 and 22 connected respectively to the branching outputs of this Y branch 14, and waveguide branches 16 and 23 connected respectively to the output ends of the double mode waveguide regions 15 and 22. The branching outputs of the waveguides 16 and 23 are connected respectively to single mode channel type optical waveguides 17, 18 and 24, 25. Also, to each of the single mode channel type optical waveguides 17, 18 and 24, 25, each of photodetectors 19, 20 and 26, 27 is coupled. Then, the outputs of photodetectors 19 and 20 are inputted into a differential amplifier 21 while the outputs of photodetectors 26 and 27 are inputted into another differential amplifier 28.

Here, in the apparatus shown in FIG. 3, it is preferable to make the lengths $d_1$ and $d_2$ of the double mode waveguide regions 15 and 22 sufficiently longer than the coupling length Lc as well as to make the length $d_1$ of the double mode waveguide region 15 sufficiently different form the length $d_2$ of another double mode waveguide region 22. In the apparatus shown in FIG. 3, a selection is made so that the length $d_1$ of the double mode waveguide region 15 is sufficiently longer than the length $d_2$ of the double mode waveguide 22.

In the apparatus in FIG. 3, the incident light 11 which is the light to be measured is inputted into the single mode channel type optical waveguide 13 formed on the waveguide substrate 12. Then, the light propagated in the aforesaid optical waveguide 13 is divided substantially into two equal portions by the Y branch 14 and one is inputted into the double mode waveguide region 15, and the other, into the double mode waveguide region 22. The light propagated in the double mode waveguide region 15 while being zigzagged in the width-wise direction therein as described earlier is branched by waveguide branching 16 and propagated through each of the single mode channel type optical waveguides 17 and 18 to be inputted into each of the photodetectors 19 and 20 where it is converted into electric signals. These electic signals are inputted into the differential amplifier 21. Then, a signal corresponding to the difference between them is generated.

Meanwhile, the light traveling in the double mode waveguide region 22 is likewise propagated while being vibrated in the width-wise direction and divided by the waveguide branching 23 to be propagated in each of the single mode channel type optical waveguides 24 and 25. The respective light propagated in these waveguides 24 and 25 is inputted into each of the photodetectors 26 and 27 and converted into electric signals. The output corresponding to the difference between these electric signals is generated by the differential amplifier 28 as in the case described earlier.

Figure 4:
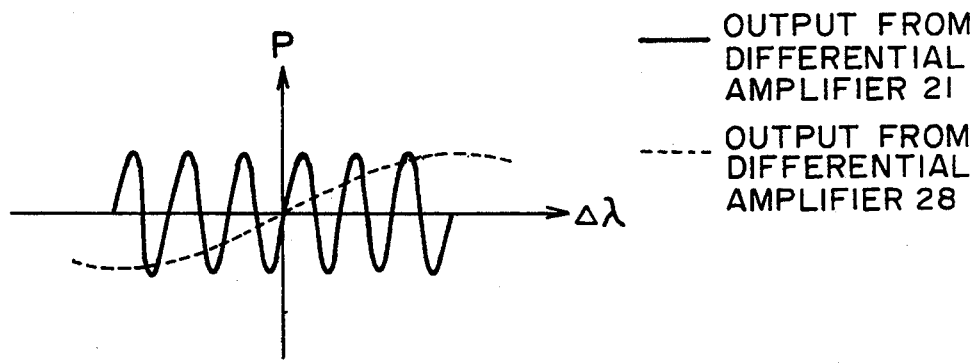
FIG. 4 is a graph showing the relationship between the output of each differential amplifier and the variation amount of wavelength in the apparatus shown in FIG. 3.

Hence, in the apparatus shown in FIG. 3, the outputs corresponding respectively to the wavelength of the incident light 11 can be obtained from the differential amplifiers 21 and 28. Here, the lengths of the two double mode waveguide regions 15 and 22 are selected intentionally to differ from each other sufficiently. Accordingly, the relationship between each of the outputs from the differential amplifiers 21 and 28 and the variation value $\Delta\lambda$ of the incident light becomes as shown in FIG. 4. Therefore, by the utilization of the two outputs, each one from the differential amplifiers 21 and 28, a rough measurement and fine measurement of the wavelength of the incident light are obtained simultaneously, thus making it possible to obtain the absolute value of the wavelength precisely in a wide range.

In this respect, although the double mode waveguide regions are provided at two locations (15 and 22) in the apparatus shown in FIG. 3, it may be possible to provide the double mode waveguide regions and other components at three locations or more by arranging the Y branch 14 to have more numbers of branchings.

Figure 5:
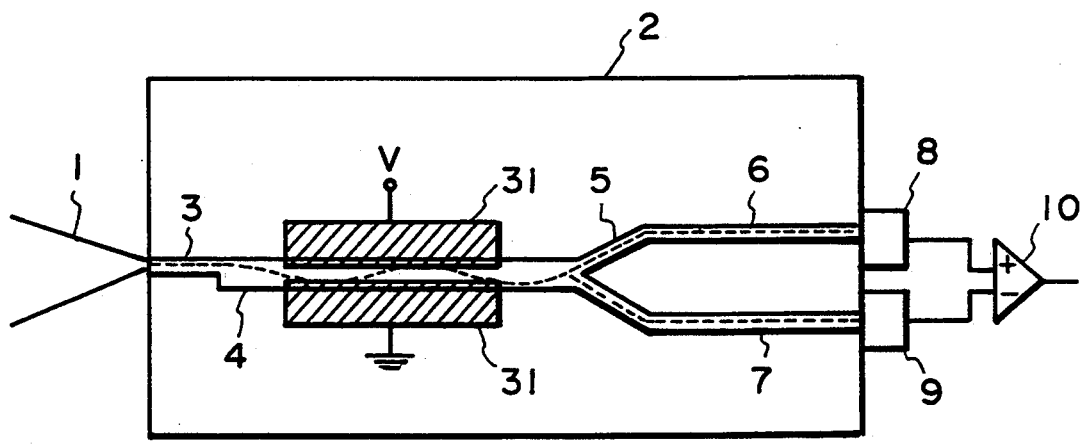
FIG. 5 is a plan view schematically showing a waveguide type wavelength measuring apparatus according to a third embodiment of the present invention.

FIG. 5 illustrates the structure of a waveguide type wavelength measuring apparatus according to a third embodiment of the present invention. In the apparatus in FIG. 5, electrodes 31 made of aluminum are arranged in the double mode waveguide region 4, and as the waveguide substrate 2, a dielectric crystal having electro-optical effect, such as lithuim niobate ($LiNbO_3$), is used. The other parts are the same as the apparatus shown in FIG. 1, and the same reference numerals are provided for the same members. In this respect, the electrodes 31 are arranged so that a part of each electrode is overlapped with the double mode waveguide region 4, respectively. By these electrodes 31 and double mode waveguide region 4, a so-called active mode splitter is formed. This active mode splitter causes the applied voltage V to the electrodes 31 to be varied to change the refraction factor in the double mode waveguide by the electro-optical effect by the different values with respect to the even mode and odd mode, thus varying the coupling length Lc. In this way, it is possible to change the central position of the optical energy of the incident light in the waveguide branching 5 as well as the distribution ratio of the light inputted into each of the single mode waveguides 6 and 7.

Here, in the apparatus shown in FIG. 5, a splitter of two-electrode type is illustrated, but in place of this type, some other type, such as a splitter of three-electrode type may be employed.

In the apparatus shown in FIG. 5, the incident light 1 is propagated to the double mode waveguide region 4 through the single mode channel type optical waveguide 3. Then, as described earlier, the light distributively output from the double mode waveguide region 4 by the ratio corresponding to the voltage V applied between the electrodes 31 travels to each of the single mode channel type optical waveguides 6 and 7 to be converted into the respective electric signals by the photodetectors 8 and 9. These electric signals become a signal corresponding to the difference between them by the differential amplifier 10 as in the case shown in FIG. 1.

In an operation such as this, by adjusting the applied voltage V to the electrodes 31, the distribution ratio of the optical energy of the incident light to the single mode channel type optical waveguides 6 and 7 is equalized. In other words, by equalizing the output signals from the photodetectors 8 and 9, it is possible to make the output from the differential amplifier 10 zero. Therefore, if only the relationship between the applied voltage V to the electrodes 31 for making the output from the differential amplifier 10 zero and the wavelength of the incident light is defined in advance, the wavelength of an unknown incident light can be obtained from the value of a voltage V to be applied in order to make the output from the differential amplifier 10 zero. With a measuring method such as this, the wavelength of the incident light 1 can be measured with a constant and maximum sensitivity, i.e., at a point intersecting the value P=0 in FIG. 2A and FIG. 2B.

In the apparatus according to the second embodiment shown in FIG. 3, the double mode waveguide regions 15 and 22 can serve as active mode splitters by providing them with electrodes respectively. Hence, it is possible to apply the same measuring method illustrated in FIG. 5 to the apparatus shown in FIG. 3.

[Effect of the Invention]

According to the present invention as set forth above, it is possible to implement a highly precise wavelength measuring apparatus with an extremely miniaturized and compact structure as well as to perform the precise real-time measurement of the variation of wavelength of the emitted light and other effects accompanying the variation amount of the inputted current of a semiconductor laser, for example.

Also, if a semiconductor such as silicon is used as a waveguide substrate, the photodetectors and the like can be integrated on the same substrate monolithically, thus enabling the entire body of the apparatus to be manufactured by the so-called bath process, leading to the implementation of a highly reliable waveguide type wavelength measuring apparatus at an extremely low cost.

Further, if a dielectric crystal having an electro-optical effect such is used as LiNbO$_3$ as a waveguide substrate, it is possible to make the mode splitter an active mode splitter, so that the wavelength measurement can be performed with a constant and maximum sensitivity with respect to the wavelength.

Furthermore, by inputting a predetermined wavelength of light into the apparatus according to the present invention, it becomes possible to obtain a measurement of the temperature variation of the waveguide device. This is, as well known, due to the fact that if the refraction factor of a waveguide varies by a temperature change, the coupling length Lc can also change. As a result, the present apparatus can serve also as a highly precise thermometer.

What is claimed is:

1. A waveguide type wavelength measuring apparatus comprising:

a single mode channel type optical waveguide formed on a waveguide substrate and having an input end to which light, the wavelength of which is to be measured, is inputted, and an output end;

a double mode waveguide having an input end connected to the output end of said single mode channel type optical waveguide for receiving light therefrom and having an output end of said double mode waveguide having a predetermined length substantially longer than a coupling length Lc that is the length of a region of the double mode waveguide required for light energy therein to reciprocate in half a cycle;

waveguide branching means for receiving light from the output end of said double mode waveguide and dividing that light into waveguide branches;

photodetectors for detecting, independently, light divided into the waveguide branches, respectively, and for producing corresponding outputs; and means for comparing the outputs from said photodetectors to provide an output that varies with the wavelength of the light inputted to said single mode waveguide;

wherein the length of said double mode waveguide is substantially greater than said coupling length Lc, whereby accurate measurement of the wavelength of the inputted light is attained.

2. A waveguide type wavelength measuring apparatus according to claim 1, wherein said double mode waveguide is constructed by two single mode channel type optical waveguides adjacent to each other.

3. A waveguide type wavelength measuring apparatus according to claim 1, wherein said waveguide substrate is constructed by a semiconductor material, and said photodetectors are formed monolithically on a substrate on which each of said waveguide is formed.

4. A waveguide type wavelength measuring apparatus according to claim 1, wherein said waveguide substrate is constructed by a dielectric crystal having electro-optical effect, electrodes are arranged in a region of said double mode waveguide, and the wavelength of the light is measured on the basis of a voltage applied to said electrodes and outputs from said photodetectors.

5. A waveguide type wavelength measuring apparatus according to claim 1, wherein said comparing means includes a differential amplifier to generate an output as a wavelength measuring signal.

6. A waveguide type wavelength measuring apparatus comprising:

a first single mode channel type optical waveguide formed on a waveguide substrate and having an input end to which light, the wavelength of which is to be measured, is inputted, and having an output end;

first light branching means for receiving and dividing light from said first single mode channel type optical waveguide, said first light branching means including second and third single mode channel type optical waveguides, each having an input end connected to the output end of said first single mode channel type optical waveguide and having an output end;

a first wavelength detecting means including a first double mode waveguide having an input end connected to the output end of said second single mode channel type optical waveguide and having an output end, second light branching means for receiving and dividing light from said first double mode waveguide, said second light branching means including a pair of branch waveguides each having an input end connected to the output end of said first double mode waveguide and having an output end, a first pair of photodetectors to detect, independently, light from the output ends of said pair of branch waveguides and to produce, respectively, corresponding outputs, and a first signal processing means for comparing the outputs of said first pair of photodetectors to produce a signal that varies with the wavelength of the light inputted to said first single mode channel type optical waveguide, said first double mode waveguide having a predetermined length d1; and a second wavelength detecting means including a second double mode waveguide having an input end connected to the output end of said third single mode channel type optical waveguide and having an output end, a third light branching means for receiving and dividing light from said second double mode waveguide, said third light branching means including a pair of branch waveguides each having an input end connected to the output end of said second double mode waveguide and having an output end, a second pair of photodetectors to detect, independently, light from the output ends of the last-mentioned pair of branch waveguides and to produce, respectively, corresponding outputs, and a second signal processing means for comparing the outputs of said second pair of photodetectors to produce a signal that varies with the wavelength of the light inputted to said first single mode channel type optical waveguide, said second double mode waveguide having a predetermined length d2;

wherein the length d1 of said first double mode waveguide is different from the length d2 of said second double mode waveguide, whereby a rough measurement and a fine measurement of the wavelength of said light inputted to said first single mode channel type optical waveguide are attained by said first wavelength detecting means and said second wavelength detecting means.

7. A waveguide type wavelength measuring apparatus according to claim 6, wherein each said length d1 and said length d2 is substantially greater than a coupling length Lc that is the length of a region of the corresponding double mode waveguide required for light energy therein to reciprocate in half a cycle.

8. A waveguide type wavelength measuring apparatus according to claim 6, wherein said first double mode waveguide and said second double mode waveguide are formed on said waveguide substrate, said waveguide substrate is constructed by a dielectric crystal having electro-optical effect, and electrode means are provided at a region of at least one of said first and second double mode waveguides for changing refraction factor therein by the electro-optical effect.

9. A light wavelength measuring apparatus comprising:

a single mode channel type optical waveguide formed on a waveguide substrate and constructed by a dielectric crystal having electro-optical effect, said single mode channel type optical waveguide having an input end to which light, the wavelength of which is to be measured, is inputted, and having an output end;

a double mode waveguide formed on said waveguide substrate and having an input end connected to the output end of said single mode channel type optical waveguide for receiving light therefrom, said double mode waveguide having a predetermined length substantially longer than a coupling length Lc that is the length of a region of the double mode waveguide required for light energy therein to reciprocate in half a cycle;

electrode means provided at a region of said double mode waveguide for varying the coupling length Lc by the electro-optical effect in accordance with variable voltage applied to said electrode means by voltage applying means;

waveguide branching means for dividing light from the output end of said double mode waveguide and including a pair of branch waveguides, each having an input end connected to the output end of said double mode waveguide and having an output end;

a pair of photodetectors to detect, independently, light from the output ends of said pair of branch waveguides and to produce, respectively, corresponding outputs; and signal processing means for comparing outputs from said pair of photodetectors and producing information dependent on a relation between the outputs from said pair of photodetectors;

wherein said voltage applying means applies a voltage that causes equality between the outputs from said pair of photodetectors, and wherein the wavelength of the light inputted to said single mode channel type optical waveguide is determined based on the applied voltage when said signal processing means produces information that the outputs from said pair of photodetectors are equal.

10. A light wavelength measuring apparatus according to claim 9, wherein said signal processing means includes a differential amplifier which generates a zero output signal when the outputs from said pair of photodetectors are substantially equal.

* * * * *